United States Patent

Ehret et al.

[11] Patent Number: 5,832,558
[45] Date of Patent: Nov. 10, 1998

[54] HEATED WINDSHIELD WIPER BLADE ASSEMBLY

[76] Inventors: David B. Ehret; Boyd P. Ehret, both of 4059 Douglas Dr. , North, Crystal, Minn. 55422

[21] Appl. No.: 808,384

[22] Filed: Feb. 28, 1997

[51] Int. Cl.⁶ .................................................. B60S 1/38
[52] U.S. Cl. .................................. 15/250.06; 15/250.48; 219/202
[58] Field of Search ............................ 15/250.06, 250.07, 15/250.08, 250.09, 250.05, 250.48, 250.301; 219/202, 203, 492, 493, 482, 490

[56] References Cited

U.S. PATENT DOCUMENTS

| | | | |
|---|---|---|---|
| 2,656,448 | 10/1953 | Lentz | 15/250.06 |
| 3,639,938 | 2/1972 | Golden | 15/250.06 |
| 3,718,940 | 3/1973 | Bode | 15/250.06 |
| 4,152,808 | 5/1979 | Andregg | 15/250.07 |
| 4,243,879 | 1/1981 | Chang | 219/492 |
| 4,360,941 | 11/1982 | Mabie | 15/250.06 |
| 4,387,290 | 6/1983 | Yasuda | 15/250.07 |
| 4,603,451 | 8/1986 | Van Sickle | 15/250.07 |
| 4,967,437 | 11/1990 | Morse | 15/250.07 |

*Primary Examiner*—Gary K. Graham
*Attorney, Agent, or Firm*—Herman H. Bain

[57] ABSTRACT

A heated wiper blade assembly for vehicles comprises an electric resistance heating element molded within the conventional wiper blade. A normally closed timer or temperature sensor controls operation of the heating element. The heating element heats the wiper blade and prevents ice build-up on the blade during snow or sleet precipitation.

1 Claim, 1 Drawing Sheet

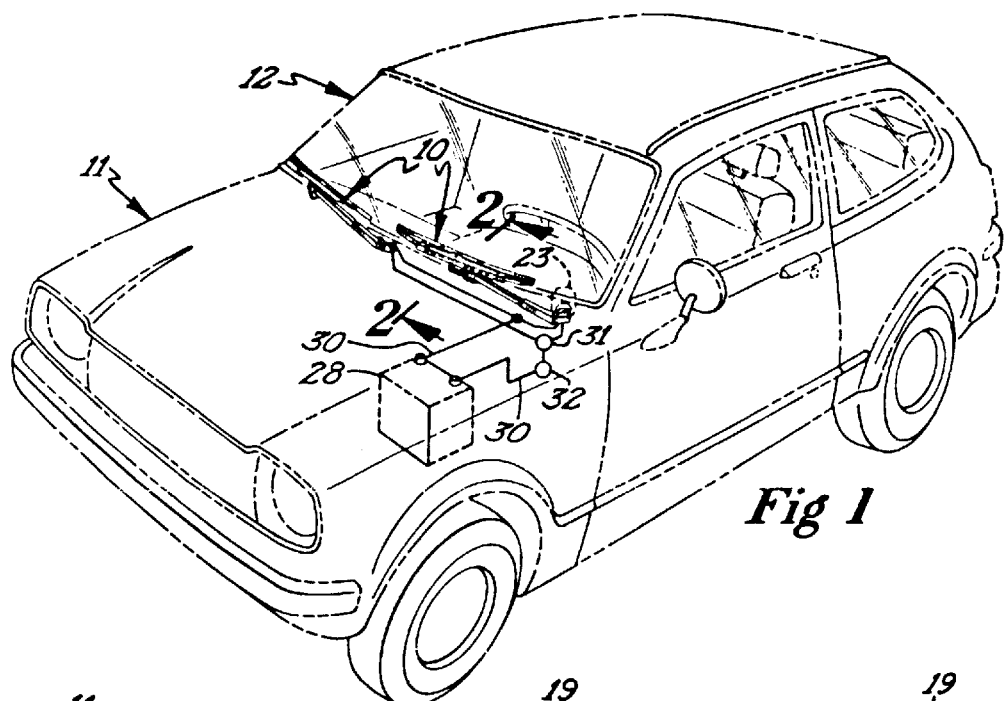
*Fig 1*
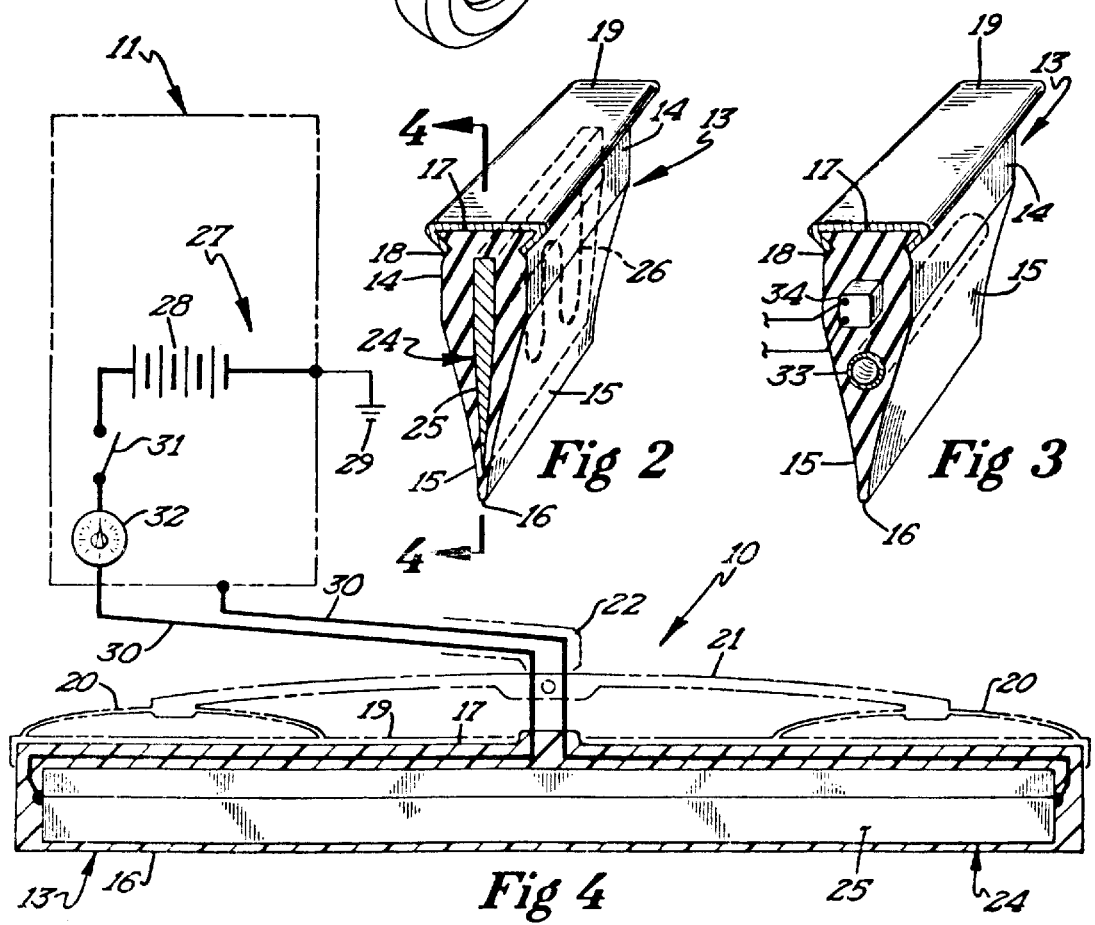
*Fig 2*  *Fig 3*  *Fig 4*

HEATED WINDSHIELD WIPER BLADE ASSEMBLY

FIELD OF THE INVENTION

This invention relates to a heated windshield wiper blade assembly.

BACKGROUND OF THE INVENTION

Automobile drivers in colder temperate regions experience snowfalls throughout the winter months. Windshield wipers are operated during snowfall or sleet precipitation to clean the windshield. However, when the temperature is very cold, ice builds up on the wiper blade and interferes with the wiping effect of the blade. Defrosting of the windshield during these cold winter snowfalls and sleet precipitation is simply ineffective. All efforts at providing an effective heated windshield wiper assemblies have apparently proved unsuccessful.

SUMMARY OF THE INVENTION

It is an object of this invention to provide the windshield wiper blade of an automotive vehicle with an electrical heating element molded into the wiper blade which effectively heats the blade and thereby prevents ice build up on the blade.

A more specific object of this invention is to provide circuitry for the electric heating element in the flexible wiper blade with control means, namely a temperature sensor or a pulse timer, for interrupting the current to the heating element in response to temperature changes or time lapses.

The flexible wiper blade is provide with a resistance heating element molded therein which is connected by suitable circuitry to the vehicle battery. The circuitry includes a normally closed timer or timing circuit which opens and closes in response to the passage of a predetermined time. When the circuit to the windshield wiper blade heating element is energized, the heating element heats the windshield wiper and prevents ice build up on the blade thereby assuring efficient wiping and snow removal from the windshield. In one embodiment, the heating element comprises wedge shaped plastic sheet having the metallic resistance heating element etched therein. In another embodiment, the heating element is an elongate wire-like structure embedded in the wiper blade. A temperature sensor may also be used in place of the timer circuit and the temperature sensor will open and close in response to the temperature of the wiper blade reaching or falling below a predetermined level.

BRIEF DESCRIPTION OF THE FIGURES OF THE DRAWING

FIG. 1 is a perspective view of the novel windshield wiper blade assembly mounted on a vehicle;

FIG. 2 is a cross sectional view taken approximately along line 2—2 on an enlarged scale and looking in the direction of the arrows;

FIG. 3 is a cross sectional view similar to FIG. 2 but illustrating a different embodiment of the invention, and;

FIG. 4 is a cross sectional view taken approximately along line 2—2 of FIG. 2 and looking in the direction of the arrows and further including a circuit diagram for the windshield wiper blade assembly.

DESCRIPTION OF THE PREFERRED EMBODIMENT

Referring now to the drawings and more particularly to FIG. 1, it will be seen that the novel wiper blade assembly 10 is illustrated as a conventional component of an automotive vehicle 11 for cleaning the windshield 12 thereof. The windshield wiper blade assembly 10 includes a generally wedge shaped elongate flexible blade 13 formed of a flexible material such as rubber. The blade 13 has upper parallel side portions 14, converging side portions 15 which converge to define a wiper edge 16, and a back surface 17 having dovetail grooves 18 there. The dovetail grooves accommodate the inwardly extending legs of a channel shaped blade retainer element 19. The retainer element is preferably formed of metal.

Each blade assembly includes a pair of elongate tensioners 20 formed of resilient material which engage the bight portion of the blade retainer element 19. The mid-portions of the tensioners 20 are secured to the ends of an elongate holder 21 as best seen in FIG. 4. The mid-portion of the holder is secured to one end of an elongate drive arm 22. The other end of the drive arm is secured to the output shaft of a wiper motor 23. The wiper blade assembly thus described is of generally conventional construction and a pair of such blades are typically provided for cleaning the windshield of automotive vehicles.

Referring now to FIGS. 2 and 4, it will be seen that the flexible blade 13 has an electrical resistance heating element 24 embedded therein. The heating element in the embodiment shown is comprised of an elongate mylar sheet 25 having a sinuously arranged metallic electric resistance element 26 etched therein throughout substantially its entire length. The heating element 24 is of generally elongate configuration and extends from adjacent the upper or back surface 17 downwardly and terminates adjacent the wiper edge 16. With this arrangement, the flexible wiper blade is quickly and efficiently heated throughout when the heater element is energized.

Referring now to FIGS. 2 and 4, it will be seen that the heating element is provided with operating electrical circuitry 27 for controlling operation of the heating element. The circuitry 27 includes a battery 28 as the source of electrical current. One terminal of the battery is connected to ground 29 in the conventional way. The other terminal of the battery is connected to the heating element by a conductor 30 and a second conductor 30 connects the heating element to ground. Interposed in circuit controlling relation is an on/off switch 31 and a normally closed timer or timing circuit 32. The timer 32 is adjustable to alternately open and close the circuit to the heating element in response to the passage of a predetermined period of time.

Referring now to FIG. 4, it will be seen that a slightly different embodiment of the heating element for the wiper blade is thereshown. It will be seen that the flexible blade 13 is provided with an elongate coiled metallic heating element 33. It will also be noted that the heating element 33 is embedded or molded in the flexible blade 13 and is connected by suitable conductors to a battery utilizing the circuitry depicted in FIG. 4. It will be noted that the embodiments of FIG. 3 is also provided with a heat sensor control element 34 in the place of the timer. The heat sensor 34 is normally closed and will open when the temperature of the wiper blade reaches a predetermined level. Thereafter, when the temperature of the wiper blade falls below a predetermined level, the heat sensor (switch) will close and the circuitry will again be energized. With this arrangement, the wiper blade will be maintained in a heated condition during operation of the heating element circuit. It is also pointed out that heating element circuitry of FIG. 3 may use a normally closed timer 32 instead of the heat sensor while the heating element circuitry of FIG. 4 may use a heat sensor 34 instead of the timer 32.

During operation of the heated windshield wiper blade, the wiper blade assembly 10 will be operated in the conventional manner whereby the blades wipe the windshield to remove snow and sleet on colder days. The on/off switch 31 will be closed to energize the heating element circuit. The timer 32 which is normally closed will permit current to flow through the heating element which will immediately heat the wiper blade for a predetermined time. When the wiper blade becomes heated, ice cannot form and adhere to the wiper blade. Therefore operation of the wiper blade assembly will be effective in removing snow and ice from the windshield. After the passage of a predetermined period of time, the circuit to the heating element will be opened by the timer 32 and will remain open for a predetermined period of time. Thereafter, the circuit will again be energized for a set time thereby assuring that the wiper blade will be maintained in a heated condition without any attendant problem of overheating.

In the event that a temperature sensor is used as the control element in the circuitry, the temperature sensor is normally closed and allows current to the heating element to energize the latter. The temperature sensor will remain in a closed condition until the temperature of the wiper blade reaches a predetermined level and the temperature sensor will then open in response to the blade 13 reaching this particular temperature. The circuit to the heating element will remain closed until the temperature of the wiper blade falls below the predetermined level and the current will again flow to the heating element.

From the foregoing description, it will be seen that I have provided a conventional windshield wiper with a heating element having suitable controls for controlling operation of the heating element during cold weather. This arrangement permits efficient operation of the wiper blade for removing snow and ice from the windshield and prevents the build up of ice on the wiper blades.

What is claimed is:

1. A reciprocating heated windshield wiper blade assembly for a vehicle having a windshield comprising;

a flexible blade, a blade retainer secured to said blade, a blade holder, tensioning elements interconnecting the retainer to the holder, and a drive arm interconnecting the blade to a wiper motor for arcuately reciprocating the flexible blade assembly over the windshield of the vehicle, an electric heating element embedded in said flexible blade, said heating element comprising a relatively thin, flexible plastic strip molded within the flexible blade, a metallic resistance heating element etched into said plastic strip, electric circuitry connecting said heating element to a source of electrical power, a switch for selectively energizing said circuitry, and control means for controlling the flow of electrical current to said heating element, said control means comprising a normally closed pulse timer circuit for alternately opening and closing the flow of current to the heating element in response to the passage of a predetermined period of time when the electric circuitry to the heating element is in a closed or open condition whereby when said heating element is energized the wiper blade will be heated.

* * * * *